(12) United States Patent
Carr et al.

(10) Patent No.: US 10,546,212 B2
(45) Date of Patent: *Jan. 28, 2020

(54) IMAGE PATCH MATCHING USING PROBABILISTIC SAMPLING BASED ON AN ORACLE

(71) Applicant: Adobe Inc., San Jose, CA (US)

(72) Inventors: Nathan Carr, San Jose, CA (US);
Kalyan Sunkavalli, San Jose, CA (US);
Michal Lukac, San Jose, CA (US);
Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,166

(22) Filed: Oct. 1, 2018

(65) Prior Publication Data

US 2019/0042875 A1 Feb. 7, 2019

Related U.S. Application Data

(63) Continuation of application No. 15/342,793, filed on Nov. 3, 2016.

(51) Int. Cl.
*G06K 9/62* (2006.01)

(52) U.S. Cl.
CPC ......... *G06K 9/6202* (2013.01); *G06K 9/6215* (2013.01); *G06K 9/6277* (2013.01)

(58) Field of Classification Search
CPC ... G06K 9/6202; G06K 9/6215; G06K 9/6277
(Continued)

(56) References Cited

U.S. PATENT DOCUMENTS

| 2008/0152225 A1 | 6/2008 | Iwamoto | |
| 2010/0104158 A1* | 4/2010 | Shechtman | G06K 9/46 382/131 |

(Continued)

FOREIGN PATENT DOCUMENTS

EP 2209090 A1 7/2010

OTHER PUBLICATIONS

Barnes, C., Shechtman, E., Finkelstein, A., and Goldman, D. B. Aug. 2009. Patchmatch: A randomized correspondence algorithm for structural image editing. In ACM SIGGRAPH 2009 Papers, ACM, New York, NY, USA, SIGGRAPH '09, 24:1-24:11.

(Continued)

*Primary Examiner* — Jonathan S Lee
(74) *Attorney, Agent, or Firm* — Keller Jolley Preece

(57) ABSTRACT

The present disclosure is directed toward systems and methods for image patch matching. In particular, the systems and methods described herein sample image patches to identify those image patches that match a target image patch. The systems and methods described herein probabilistically accept image patch proposals as potential matches based on an oracle. The oracle is computationally inexpensive to evaluate but more approximate than similarity heuristics. The systems and methods use the oracle to quickly guide the search to areas of the search space more likely to have a match. Once areas are identified that likely include a match, the systems and methods use a more accurate similarity function to identify patch matches.

20 Claims, 10 Drawing Sheets

(58) Field of Classification Search
USPC .......................................................... 382/209
See application file for complete search history.

(56) References Cited

U.S. PATENT DOCUMENTS

| | | | |
|---|---|---|---|
| 2012/0088981 A1* | 4/2012 | Liu ..................... | G06K 9/6215 600/300 |
| 2012/0230591 A1 | 9/2012 | Shibata | |
| 2014/0161362 A1* | 6/2014 | Cao ..................... | G06K 9/6202 382/224 |
| 2014/0205186 A1* | 7/2014 | Cao ..................... | G06K 9/6256 382/159 |
| 2017/0039723 A1* | 2/2017 | Price .................... | G06K 9/6215 |
| 2018/0121754 A1 | 5/2018 | Carr et al. | |

OTHER PUBLICATIONS

Barnes, C., Shechtman, E., Goldman, D. B., and Finkelstein, A. Sep. 2010. The generalized PatchMatch correspondence algorithm. In European Conference on Computer Vision.

Barnes, C., Zhang, F.-L., Lou, L., Wu, X., and Hu, S.-M. Aug. 2015. Patchtable: Effcient patch queries for large datasets and applications. In ACM Transactions on Graphics (Proc. SIGGRAPH).

Liu, Siying, et al. "PatchMatch-based automatic lattice detection for near-regular textures." Proceedings of the IEEE International Conference on Computer Vision. 2015.

Li, Yu, et al. "Spm-bp: Sped-up patchmatch belief propagation for continuous mrfs." Proceedings of the IEEE International Conference on Computer Vision. 2015.

Muller, Oliver, Michael Ying Yang, and Bodo Rosenhahn. "Slice sampling particle belief propagation." Proceedings of the IEEE International Conference on Computer Vision. 2013.

Search Report as received in GB 1711706.0 dated Jan. 15, 2018.
U.S. Appl. No. 15/342,793, Jul. 3, 2018, Notice of Allowance.
U.S. Appl. No. 15/342,793, Jan. 11, 2019, Office Action.

* cited by examiner

Generalized PatchMatch

Generalized PatchMatch
and Metropolis-Hastings

IMAGE PATCH MATCHING USING PROBABILISTIC SAMPLING BASED ON AN ORACLE

CROSS REFERENCE TO RELATED APPLICATIONS

The present application is a continuation of U.S. application Ser. No. 15/342,793, filed Nov. 3, 2016. The aforementioned application is hereby incorporated by reference in its entirety.

BACKGROUND

Many software applications exist to help users create and edit images and videos using a wide array of editing tools. Such tools range in functionality from rudimentary resizing and cropping to more complex lighting adjustments and object manipulation. Patch matching is one process often used in image editing software. Patch matching searches for parts of an image that share one or more attributes. Patch matching techniques allow for removing undesired objects from an image, in-painting new objects to match the image, stereo matching, texture synthesis, and altering a digital image in any number of ways.

Patch matching searches for similar image patches based on spatial coherence. In particular, conventional patch matching is based on using random sampling to find good matches and using natural coherence in the imagery to propagate such matches quickly to surrounding areas. Conventional patch matching scans over respective image patches of a digital image and computes a distance or similarity score. One such similarity score involves a sum-of-squares distances between pixel values. Identical patches (i.e., matches) have a sum-of-squares distance of zero. In general, finding the best patch matches for every pixel in the image requires making a large number of sum-of-squares distance evaluations.

While patch matching is faster than a brute force search, problems exist with conventional patch matching techniques. For example, conventional patch matching is slow in large search spaces. The speed of conventional patch matching further slows when allowing for patch rotation and scaling (i.e., using generalized patch match) due to the high dimensionality of the search space.

SUMMARY

One or more embodiments described herein provide benefits and solve one or more of the foregoing or other problems in the art with systems and method that provide for image patch matching with greater speed. In particular, the systems and methods described herein improve the convergence rate of finding patch matches by employing an oracle. The oracle is computationally inexpensive to evaluate but more approximate than similarity functions such as sum-of-squares distance. The systems and methods use the oracle to quickly guide the search to areas of the search space more likely to have a match. More particularly, the systems and methods sample patches from the image to further evaluate using a probabilistic algorithm that accepts image patches based on a probability based on the oracle. The oracle-based probabilistic algorithm causes the systems and methods to spend more time exploring areas of the search space likely to have matches. Once areas are identified that likely include a match, the systems and methods use a more accurate similarity heuristic to identify patch matches.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
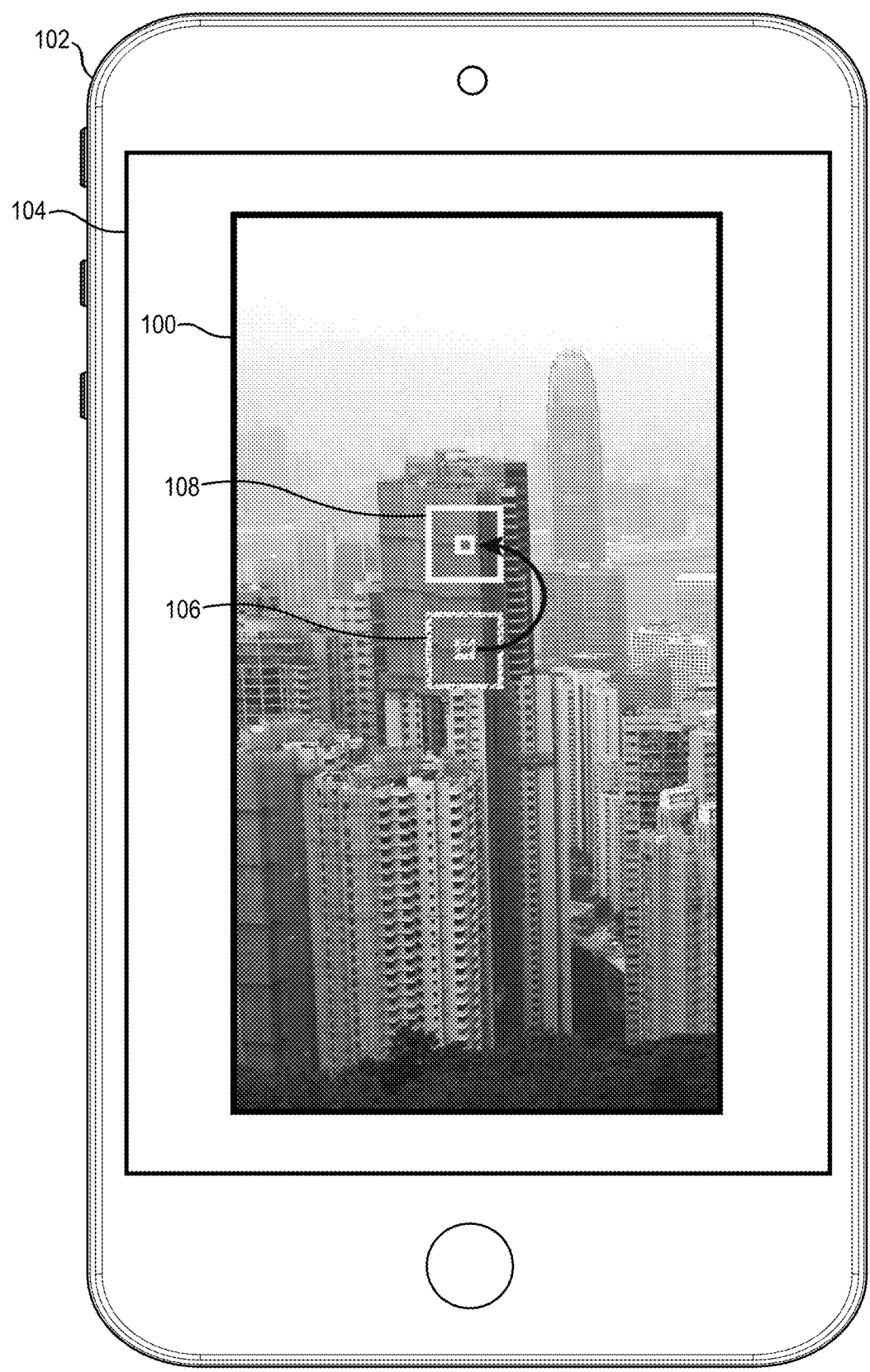
FIG. 1 illustrates a screen on a computing device showing an example of a patch match system identifying an image patch that matches a target image patch in accordance with one or more embodiments.

One or more embodiments described herein provide benefits and solve one or more of the foregoing or other problems in the art with a patch match system that provides for image patch match searching with faster convergence on matches. The patch match system described herein improves the convergence rate of finding patch matches by using an oracle to bias sampling towards those parts of the search space more likely to include a match. In particular, the patch match system uses an oracle to probabilistically identify image patches with a high likelihood of matching a target image patch. The patch match system performs a deeper analysis of the identified image patches to determine whether any of the probabilistically identified image patches actually match the target image patch.

As mentioned, the patch match system stochastically analyzes a digital image using an oracle to search for image patches of the digital image that match a target image patch. Generally, the oracle is an approximate similarity heuristic used as a bearing to quickly identify areas of an image that are likely to have a match. The patch match system uses the approximate similarity heuristic to determine approximate similarity scores for image patches of the image. The patch match system randomly or uniformly selects proposal patches and probabilistically determines whether to accept proposal patches based on the determined approximate similarity scores. Generally, patch match system accepts proposal patches using an acceptance probability that is inversely proportional to the approximate similarity score that have an approximate similarity score. The patch match system then uses a similarity heuristic to determine similarity scores for the identified image patches. The patch match system then identifies one or more image patches that are matches to the target image patch based on the determined similarity scores.

As used herein, a similarity heuristic or distance function, is an algorithm (or a combination of multiple algorithms) that outputs similarity scores. The similarity scores for two image patches allow for a determination of whether the two image patches match. Example similarity heuristics include sum-of-squares distances, $L^2$ distance, normalized correlation, distance between descriptors of patches, etc.

As used herein, an oracle or an approximate similarity heuristic, is an algorithm or function (or a combination of multiple algorithms or functions) that outputs approximate similarity scores. The approximate similarity scores for two image patches allow for an approximate determination of whether two image patches match. An approximate similarity heuristic is less complex than a similarity heuristic and less precise than a similarity heuristic. In other words, an approximate similarity heuristic requires less computational power/time to determine.

The patch match system uses the less complex, approximate similarity heuristic to decide whether or not to evaluate the more complex and more precise similarity heuristic. In other words, the patch match system uses the approximate similarity heuristic to quickly identify patches that are not likely matches and avoid spending the time and computational power to evaluate the more complex similarity heuristic. Along related lines, the patch match system uses the approximate similarity heuristic to quickly identify patches that are more likely to be a match and then evaluates the more complex similarity heuristic to verify if the identified patches indeed match a target image patch.

More particularly, the patch match system chooses proposal image patches by randomly or uniformly sampling the search space. The patch match system then probabilistically determines whether to accept the proposal image patches as approximate patch matches based on the approximate similarity heuristic (i.e., the oracle). In one or more embodiments, the patch match system samples the search space using a probabilistic sampling algorithm based on the oracle that visits the search space in rough proportion to the similarity heuristic. The probabilistic sampling algorithm creates a Markov chain whose values approximate a sample from a posterior distribution (e.g., the similarity heuristic). The patch match system uses the probabilistic sampling algorithm to sample from a proposal distribution (e.g., the approximate similarity heuristic), which attempts to converge on the posterior distribution by accepting/rejecting samples to identify samples of the posterior distribution. In some embodiments, the probability distribution of the image is conditional—i.e., the probability of acceptance of a patch proposal is based on the probability of acceptance of a previous patch proposal. In other embodiments, the probability distribution is independent of (i.e., not conditioned upon) previous patch proposals. In any event, the patch match system biases the search toward those areas of the image that are more likely (e.g., that have a higher probability) to contain a patch match.

The patch match system performs image patch matching faster than other alternative systems. By using a probabilistic sampling algorithm based on the oracle, the patch match system more quickly samples and tests image patches to map out the likelihood of finding an actual patch match in any given area within the image. Additionally, using the probabilistic sampling algorithm based on the oracle enables the system to create this type of probabilistic model in more complex search spaces (i.e., in images where direct sampling can be difficult), such as high resolution images, multi-dimensional images, and/or when allowing for patch rotation and scaling. In each of these embodiments, the patch match system saves computation time by using approximate similarity scores of patches (e.g., the oracle) to guide the search for patch matches without needing to do a pixel-by-pixel calculation. The patch match system performs detailed analysis of the more precise similarity scores only for accepted patches (i.e., those patches which are accepted by the probabilistic sampling algorithm.

The patch match system uses less memory than other patch match systems. By using a probabilistic sampling algorithm based on the oracle to find areas likely to contain precise patch matches, the patch match system performs fewer and less complex calculations than would otherwise be performed, thus using less memory by not having to calculate and store pixel-by-pixel computations associated with more complex similarity scores. Along similar lines, the patch match system also uses less computational power through more efficient patch matching.

More detail regarding the patch match system will now be provided with reference to the Figures. FIG. 1 shows a digital image 100 displayed on a computing device 102 via a touch screen 104. FIG. 1 illustrates a target image patch 108 and a proposal image patch 106 that the patch match system analyzes to determine whether or not to further analyze. As used herein, an image patch is a definable portion of a digital image. For example, an image patch is portion of an image that is p pixels by n pixels. In particular, an image patch can include a portion of an image that is seven pixels by seven pixels, ten pixels by five pixels, etc. In still other embodiments, an image patch is an irregular shape without uniform dimensions, up to and including an entire image. In other embodiments, an image patch is a square section of an image. Furthermore, a target image patch 108 is an image patch that is user-selected or else selected by the patch match system for which a match is desired. In other words, a target image patch is an input to the patch matching system for which the patch matching system tries finding matching patches.

As mentioned above, to determine whether the proposal image patch 106 matches the target image patch 108, the patch match system evaluates a similarity heuristic. For example, the patch match system uses a similarity heuristic to determine a similarity score for the proposal image patch 106 and the target image patch 108. The patch match system then compares the similarity scores of the proposal image patch 106 and the target image patch 108. For example, the patch match system determines a distance between the similarity scores of the proposal image patch 106 and the target image patch 108. Specifically, if the distance between the similarity scores of the proposal image patch 106 and the target image patch 108 is zero, the patch match system determines that the proposal image patch 106 matches the target image patch 108. If the distance between the similarity scores is not zero, the patch match system determines that the proposal image patch 106 is not a match with the target image patch 108.

As an example, the patch match system uses a sum of square differences (SSD) as the similarity heuristic. In such cases, the patch match system compares each of the pixels of the target image patch 108 with corresponding pixels of the proposal image patch 106 to determine whether the proposal image patch 106 matches the target image patch 108. In at least one embodiment, the cost of evaluating the similarity heuristic (i.e., determining similarity scores) grows with the square of the chosen patch width (e.g., a seven-by-seven-pixel patch requires summing and squaring the difference between 49 pixels). For high resolution images or images that are otherwise difficult to analyze in great detail (e.g., when patch rotation and/or scaling is enabled), evaluating the similarity heuristic can be computationally expensive.

As mentioned above, the patch match system reduces the time of convergence onto an image patch that matches a target image patch by using an oracle. As illustrated in FIG. 1, in some embodiments, the patch match system searches for image patches throughout a search space that are approximate matches to a target image patch 108. In some embodiments, the patch match system searches for image patch matches in a search space that is an entire image, portions of images that are spatial coherent to a known patch match or approximate patch match, or search spaces that include a plurality of images, such as a database of images. Generally, the patch match system probabilistically searches for image patches that are approximately similar to a target image patch 108. The patch match system utilizes a probabilistic sampling algorithm based on the approximate similarity heuristic to probabilistically determine whether to accept an image patch 106 as an approximate patch match of the target image patch 108.

As mentioned above, an approximate similarity heuristic may be referred to as an oracle that guides the patch match system to more quickly find approximate image patch matches. In some embodiments, the patch match system uses an approximate similarity heuristic in the form of an approximate distance metric to guide the search of the digital image(s) 100. In these embodiments, the patch match system calculates an approximate distance (e.g., the difference of pixel values) between the target image patch and the image patch that the patch match system is currently testing.

To illustrate, the image 100 depicting a skyline of a city has a particular distribution of patches that match the target patch 108. Determining the true distribution can be costly, however, as mentioned above and discussed in further detail below. To approximate the distribution, the patch match system uses an approximate similarity heuristic that approximates the true distribution. In other words, the patch match system randomly or uniformly selects proposal image patches within the image 100 and then, according to a probabilistic sampling algorithm, the patch match system determines whether to accept the proposal image patches as approximate matches to the target image patch 108. Whether to accept proposal image patches is determined according on the probabilistic sampling algorithm and is based on the approximate similarity heuristic. Put simply, the patch match system is driven by a probabilistic algorithm that both randomly selects proposal image patches and also identifies proposal image patches as approximate patch matches, where the probability of identifying an approximate patch match is based on the approximate similarity score of the proposal image patch. Thus, the patch match system finds approximate patch matches (e.g., approximate patch match 106) that may or may not look exactly like the target patch 108, but that are otherwise warrant a more detailed determination of whether the image patch 106 is or is not a match to the target patch 108.

As mentioned above, the patch match system uses the approximate similarity heuristic as a guide for searching a search space (e.g., image 100) for image patch matches. For example, in some embodiments, the approximate similarity heuristic is based on a color. In other embodiments, the approximate similarity heuristic is based on an image pattern, texture, or object (e.g., a series of horizontal lines, a circular object, a dewy green leaf, etc.). As an example, referring to FIG. 1, knowing that the target patch 108 is a patch of a gray building with a horizontal ledge, the patch match system can set the approximate similarity heuristic as an average color of the target image patch 108. In such embodiments, the patch match system will spend less time evaluating the blue sky or white building and more times evaluating portions of gray or other dark areas of the image 100. Alternatively, the patch match system can set the approximate similarity heuristic as the presence of horizontal edges in patch. Once again in this embodiment, the patch match system will spend less time evaluating the sky or trees in the image 100 and will focus on the portions of the image including the buildings (i.e., including edges). In still further embodiments, the patch match system uses multiple heuristics (e.g., patches that are gray and include horizontal edges) as the approximate similarity heuristic.

In short, the approximate similarity heuristic can use any attribute of a digital image to guide the search of the digital image(s) that is an approximate of a more complex similarity heuristic. In some embodiments a user defines the approximate similarity heuristic, while in other embodiments the patch match system defines the approximate similarity heuristic. In the same or other embodiments, the approximate similarity heuristic is dynamic (e.g., adjustable or adaptive). In these embodiments, the patch match system adjusts approximate similarity heuristic according to attributes or features within the searched image(s), or else in response to a user indication of a more refined search (e.g., an indication that the patch match system should return only those image patches that are very precise or exact matches to the target image patch). In these or other embodiments, the patch match system learns from the image(s) by creating and/or adjusting the approximate similarity heuristic based on features or attributes within the image(s). For example, in some embodiments, the patch match system changes the approximate similarity heuristic based on patterns or other attributes within the searched image(s) to more efficiently identify those portions or areas within the image that potentially contain patch matches (e.g., image patches that match the target image patch) and also identify those areas that are likely to not contain patch matches.

In other embodiments, the patch match system learns one or more image features or attributes of one or more digital images to use as an approximate similarity heuristic to guide the search of the digital image(s) for image patch matches. For example, the patch match system can use machine learning to analyze a set of digital image patches with ground truth patch matches. The patch match system can learn features of the digital images that indicate that a patch is likely a match to a target patch. The patch match system can then use the identification of such learned features as the approximate similarity heuristic. Similarly, the patch match system can learn the more comprehensive similarity heuristic. As a more specific example, the patch match system can use a convolutional neural network to learn feature of image patches that indicate a high likelihood of that an image patch will match a given target image patch. In one embodiment, the patch match system can use features from high-level convolutional layers as the approximate similarity heuristic and use features from a fully-connected layers as the more complex but more accurate similarity heuristic.

In any event, the patch match system utilizes the oracle to spend more time evaluating patches of a digital image 100 that are approximate matches to the target patch (e.g., target patch 108). It is generally true that image patches that are approximate patch matches of a target patch 108 are more likely to precisely match the target patch 108 than are patches are not. In some embodiments, the patch match system uses an approximate similarity heuristic to essentially measure the similarity between a proposed image patch (e.g., patch 106) and the target image patch 108, as discussed above.

As used herein, an approximate similarity score is a score assigned to an image patch within an image. In some embodiments the approximately similarity score is a number, whereas in other embodiments the approximate similarity score is a binary decision (e.g., similar or not similar). In one or more embodiments, the approximate similarity score is a mean pixel value of the patch (e.g., patch 106 or target patch 108). In other embodiments, the approximate similarity score is an approximate distance calculation. In one or more other embodiments, the patch match system assigns an approximate similarity score, for example, between one and ten, between one and one hundred, etc., to various patches (e.g., patch 106) within the image(s). In other embodiments, the patch match system assigns a mean pixel value to the target patch 108 and to each proposal patch (e.g., patch 106) within the image(s) 100. In still other embodiments, the patch match system identifies patterns or attributes of the image patch 106 and compares those patterns or attributes to those of the target patch 108 to determine whether each proposal patch 106 is an approximate match.

In at least one embodiment the approximate similarity score is a mean pixel value for a given image patch. To illustrate, a mean pixel value is an average value across all pixels in a given patch (e.g., target patch 108 or patch 106). For example, in these or other embodiments, a seven-pixel-by-seven-pixel patch has a single mean pixel value representative of the average of the values of each of the 49 pixels within this particular image patch. In some embodiments, a mean pixel value is an average of the Red Green Blue (RGB) values of each pixel within a patch, while in other embodiments, the mean pixel value is an average of Cyan Magenta Yellow Key (CMYK) values, Pantone Matching System (PMS) values, any other color space values (e.g., LAB, HSL, HSV, YUV, etc.), gray scale values, brightness values, or any other values of the pixels within a given patch (e.g., patch 106 or target patch 108). In other embodiments, the approximate similarity score is a more precise score of each pixel for a given patch. In still other embodiments, the approximate similarity score is a value (e.g., an RGB value) of one or more pixels in a particular location(s) within a patch.

In some embodiments the patch match system follows a probabilistic sampling algorithm to identify those image patches (e.g., patch 106) that are approximate matches to the target image patch 108. In these or other embodiments, the approximate similarity score is of a given image patch (e.g., patch 106) affects the probability that the image patch will be accepted as an approximate match as determined by the probabilistic sampling algorithm. Image patches with better (e.g., lower) approximate similarity scores are more likely to be accepted as approximate patch matches, while image patches with worse (e.g., higher) approximate similarity scores are less likely to be accepted as approximate patch matches. In other words, since the approximate similarity score is essentially a distance calculation, and since a distance of zero between two patches means that those patches are matches, then a lower approximate similarity score (i.e., distance) for an image patch means that the image patch is a closer match to the target image patch. In one or more embodiments, the patch match system is driven by the probabilistic sampling algorithm to select proposal image patches within the image 100 according to a distribution. In this way, the patch match system samples to one extent or another the image 100 without ignoring or missing portions of the image. In any case, after selecting a proposal image patch, the patch match system determines whether to accept the proposal image patch according to the probabilistic sampling algorithm—i.e., accepting the proposal image patch is probabilistic. As defined by the probabilistic sampling algorithm, each proposal image patch has a probability of being accepted. Additionally, the probability of being accepted is based on the approximate similarity heuristic as described above. Accordingly, the patch match system is more likely to accept proposal image patches with better approximate similarity scores according to the approximate similarity heuristic. In some embodiments, however, the patch match system accepts proposal image patches with low approximate similarity scores according to the probabilistic sampling algorithm.

As mentioned above, the patch match system converges on image patch matches more quickly than alternative techniques through the use of the approximate similarity heuristic. By following an approximate similarity heuristic, the patch match system more quickly identifies those portions of the search space (e.g., image 100) that are likely to contain patch matches. In so doing, the patch match system uses the approximate similarity heuristic to narrow the search space—i.e., to reduce the number of image patches on which the patch match system must perform more precise similarity evaluations (e.g., calculating a similarity score). Once the patch match system identifies those patches of the digital image 100 that are approximate patch matches, the patch match system more closely analyzes those approximate patch matches to find one or more patches that match the target image patch 108, as will be discussed in more detail below.

To identify proposal image patches, the patch match system probabilistically samples image patches of a search space based on the approximate similarity heuristic (i.e., the oracle). In one or more embodiments, the patch match system samples the search space using a probabilistic sampling algorithm based on the oracle that visits the search space in rough proportion to the similarity heuristic, as described above. The probabilistic sampling algorithm creates a Markov chain whose values approximate a sample from a posterior distribution (e.g., the similarity heuristic). The patch match system uses the probabilistic sampling algorithm to sample from a proposal distribution (e.g., the approximate similarity heuristic), which attempts to converge on the posterior distribution by accepting/rejecting samples to identify samples of the posterior distribution. In one or more embodiments, the probabilistic sampling algorithm is a Markov Chain Monte Carlo. More particularly, in at least one embodiment, the probabilistic sampling algorithm comprises a Metropolis Hastings algorithm.

Figure 2:
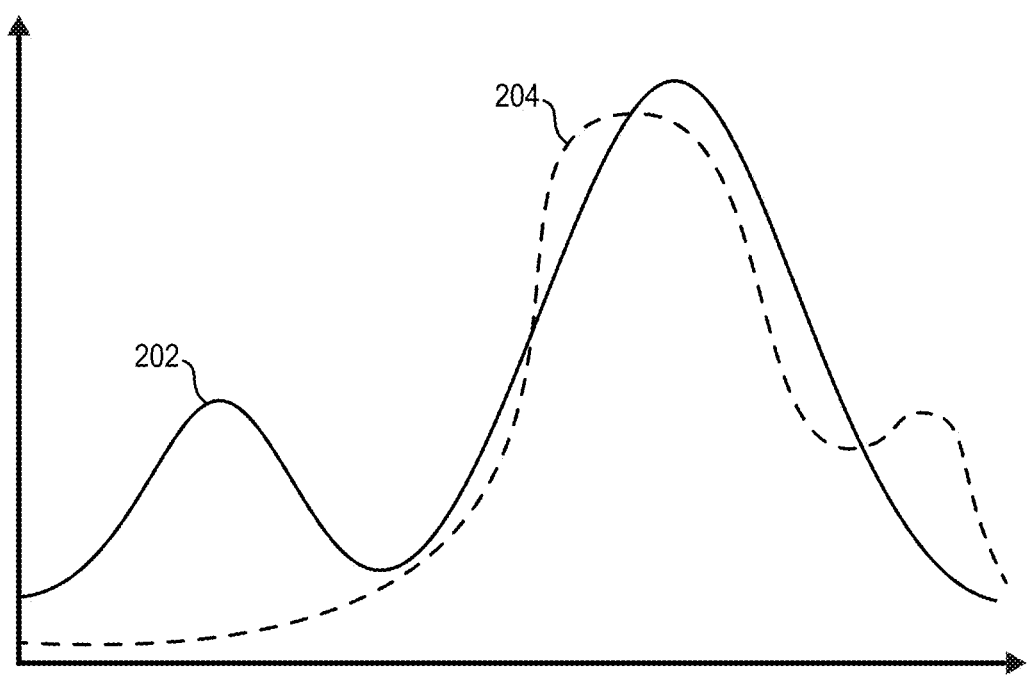
FIG. 2 illustrates a schematic overview illustrating how the approximate similarity heuristic guides a search toward likely patch matches in accordance with one embodiment.

Turning now to FIG. 2, a conceptual representation of using a probabilistic sampling algorithm based on an approximate similarity heuristic 204 to approximate a probability distribution 202 using Metropolis Hastings Markov Chain Monte Carlo is shown. The desired distribution function 202 (e.g., the similarity function) is ordinarily unknown/not determined at the start of performing an image patch matching operation on one or more digital images (e.g., image 100). However, for explanatory purposes, the desired distribution 202 is shown in FIG. 2 to provide a reference for understanding the probabilistic sampling algorithm based on the approximate similarity heuristic 204. The distribution function 202 is representative of a distribution across a search space (e.g., image 100) of, for example, image patches that contain a particular feature or attribute. The distribution 202 can be precisely determined through detailed analysis of the image(s) 100, such as through conventional methods (e.g., a sum of squared differences calculation). As can be appreciated, however, such detailed calculations are cost-prohibitive and time-intensive. By using an approximate similarity heuristic 204, the patch match system performs much less expensive (e.g., much faster) calculations to come up with an approximation of the true distribution 202. Importantly, FIG. 2 depicts the distribution 202 and the approximate similarity heuristic 204 as continuous distributions. However, in other embodiments, distribution 202 and approximate similarity heuristic 204 may also be discrete distributions comprising individual samples. As also illustrated in FIG. 2, the depicted distribution 202 and approximate similarity heuristic 204 are two-dimensional, but this is merely representative. As can be appreciated, the functions (e.g., distribution 202 and approximate similarity heuristic 204) may be any function in any number of dimensions, corresponding to the dimensionality and/or complexity of the search space (i.e., images).

As shown in FIG. 2, the patch match system utilizes an approximate similarity heuristic 204 to approximate the distribution function 202. For example, the patch match system takes sample patches of the digital image(s) 100 to approximate the distribution 202 of a particular attribute within an image (e.g., image 100), rather than calculating the exact distribution 202 by way of pixel-to-pixel calculations.

In some embodiments, the patch match system follows a Markov Chain Monte Carlo algorithm. A Markov Chain Monte Carlo algorithm is an algorithm for sampling from a probability distribution (e.g., patches within a digital image) to approximate an expected value for a given function. To illustrate from FIG. 2, the patch match system samples from the probability distribution of patches with one or more digital images to determine an approximate similarity score of each patch. Generally, a Markov Chain Monte Carlo samples a probability distribution based on constructing a Markov Chain. A Markov Chain is a stochastic model describing a sequence of possible events in which the probability of each event depends on the state of the previous event. Essentially, a Markov Chain Monte Carlo is an algorithm that "walks" through a probability distribution (e.g., a series of patches within a digital image), generating and testing candidates (e.g., proposal image patches) to map out locations of approximate image patch matches within the search space. In particular, in at least one embodiment, the patch match system described herein uses a Metropolis Hastings Markov Chain Monte Carlo to find approximate patch matches. For purposes of understanding, the Metropolis Hastings algorithm is a specific Markov Chain Monte Carlo method, and is effective in especially complex search spaces such as, for example, very high resolution images or when rotation, scaling, or other manipulation is enabled for the images or patches within images.

For illustrative purposes, the Metropolis Hastings algorithm can be described using pseudo code. The following is example pseudo code for implementing one embodiment of the Metropolis Hastings algorithm for image patch matching.

Algorithm 1: M-H Patch Selection

```
 1: Input: Patch P_i, and its current match P_j
 2: Output: Next match P_k
 3: procedure M-H PATCH SELECTION
 4:     matchFound ← false
 5:     while matchFound == false do
 6:         P_k ← new patch proposal
 7:         π_i(P_k) ← probability of new proposal
 8:         A ← min(1, (π_i(P_k) q_i(P_j | P_k)) / (π_i(P_j) q_i(P_k | P_j)))
 9:         u ← uniform (0,1)
10:         if u < A then
11:             matchFound ← true
12:         end if
13:     end while
14: end procedure
```

Where: $P_i$ is the initial patch; $P_j$ is the current match of the target patch; $P_k$ is a new patch proposal; $\pi_i(P_k)$ is the probability of a new proposal being a match; A is an acceptance probability as defined by the algorithm; $q_i$ is the approximate similarity heuristic or oracle function; and u is a defined variable as defined by the algorithm. Of note, in this pseudo code the probability of a new proposal is conditional—i.e., the probability of a subsequent state (e.g., patch proposal) depends on the current state (e.g., patch proposal) of the patch match system as it searches patch-by-patch for image patches that match the target image patch.

Algorithm 1 produces a Markov chain whose values approximate a sample from some posterior distribution. The posterior distribution that the patch match system seeks is to produce a sequence of match locations that follows the oracle. When the oracle is a good approximation of the similarity heuristic, the patch match system spends more time visiting locations that are more likely to be good matches. Thus, the oracle allows the patch match system to quickly to test patches to see if they are likely good matches. An issue, however, is that the normalizing term to generate a proper distribution directly from the oracle is unknown. Fortunately, the MH algorithm allows the patch match system to avoid the need to compute the normalizing factor. More specifically, it is sufficient that the oracle (error estimator) be proportional to the posterior similarity heuristic.

Algorithm 1 works by computing a new patch location and then either accepting or rejecting that location based some acceptance probability A. The acceptance probability A is a ratio of the posterior and proposal probabilities, in particular:

$$\frac{\pi_i(P_k)}{\pi_i(P_j)} \text{ and } \frac{q_i(P_j | P_k)}{q_i(P_k | P_j)}.$$

In at least one embodiment, the patch match system uses the difference of patch means as the oracle and passes it through a Gaussian so:

$$\pi_i(P_j) = e^{-(\mu(P_i) - \mu(P_j))^2}$$

where $\mu(.)$ denotes the mean value for a patch. Note that $\pi_i$ is given with respect to the base patch $P_i$. Because the patch match system takes a ratio to compute the posterior probability, the function $\pi_i$ need not be normalized over the domain.

As discussed above, the patch match system can select any number of heuristics for the proposal distribution (i.e., the oracle or approximate similarity heuristic). For example, the patch match system can select $q_i(P_j|P_k)$ to be a Gaussian centered at $P_j$.

In at least one embodiment, the patch match system uses a uniform distribution over the domain to simplify the proposal distribution. In such embodiments, the Metropolis Hastings algorithm is independent, where the probability of a new proposal is not dependent on current or previous proposals or states/patches. By choosing uniform sampling, the ratio:

$$\frac{q_i(P_j \mid P_k)}{q_i(P_k \mid P_j)}$$

becomes one. The following pseudo code illustrates an example embodiment of independent Metropolis Hastings.

---
Algorithm 2: Independence M-H Patch Selection
---

1: Input: Patch $P_i$, and its current match $P_j$
2: Output: Next match $P_k$
3: procedure INDEPENDENCE M-H PATCH SELECTION
4:    matchFound ← false
5:    while matchFound == false do
6:       $P_k$ ← new patch proposal
7:       $\pi_i(P_k)$ ← probability of new proposal
8:       $A \leftarrow \min\left(1, \frac{\pi_i(P_k)}{\pi_i(P_j)} \frac{q_i(P_j)}{q_i(P_k)}\right)$
9:       u ← uniform (0,1)
10:      if u < A then
11:         matchFound ← true
12:      end if
13:    end while
14: end procedure

---

Figure 3:
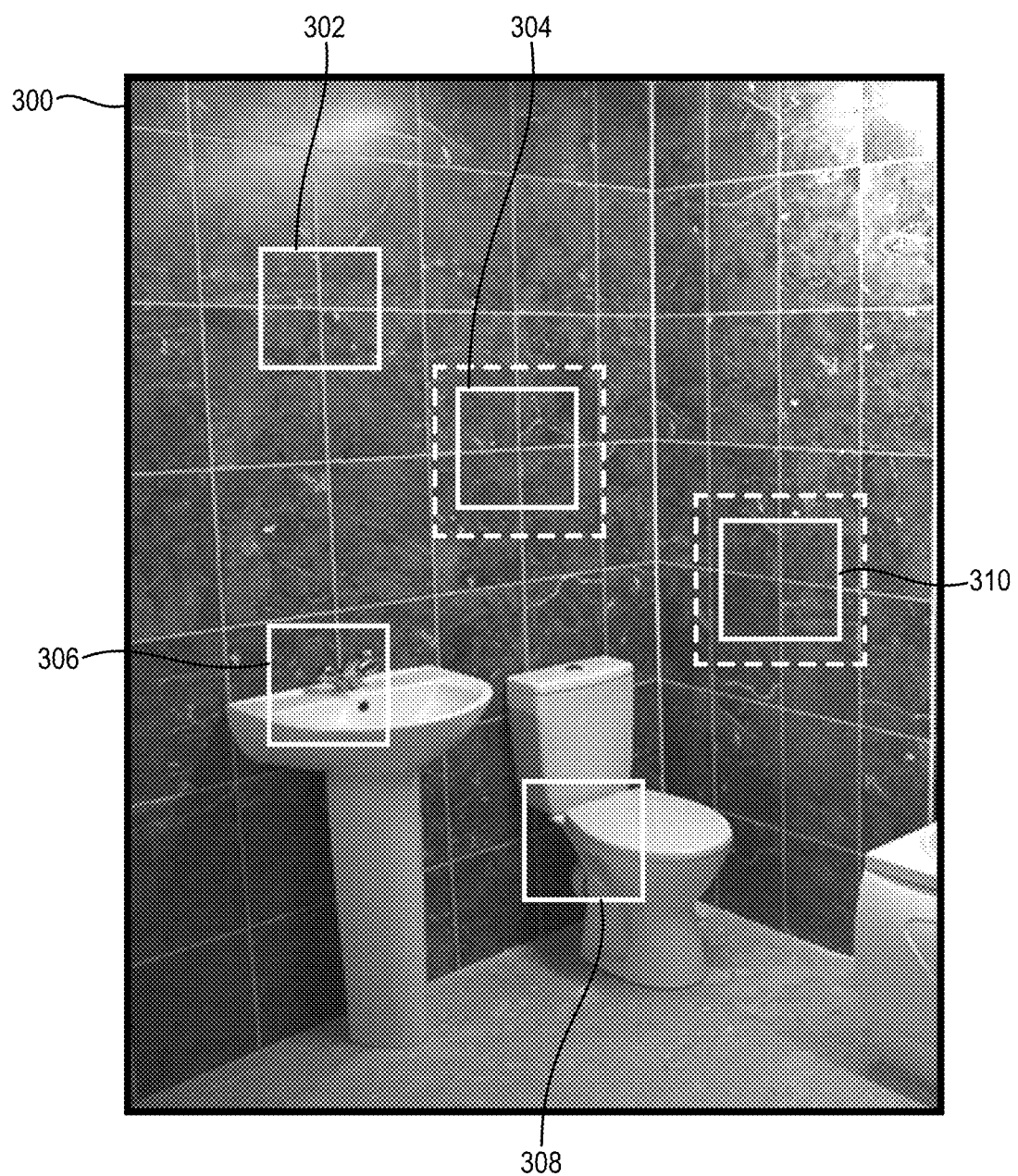
FIG. 3 illustrates an example digital image showing a simplified example of sampling in which the patch match system identifies image patch matches in accordance with one or more embodiments.

Now looking to FIG. 3, the patch match system uses the Metropolis Hastings Markov Chain Monte Carlo algorithm to sample image patches of the image(s) 300 to find those patches that are approximate patch matches to the target patch 302, such as patch 304 and patch 310. As depicted in FIG. 3, the patch match system searches an image 300 of a bathroom with tiled walls for image patches that match a target patch 302. The patch match system implements a Metropolis Hastings Markov Chain Monte Carlo algorithm to probabilistically follow a distribution of the search space (e.g., image(s) 300) as described above with reference to FIG. 2. In particular, the patch match system randomly or uniformly proposes patches (e.g., patch 304, patch 306, patch 308, or patch 310) within the image 300 and probabilistically accepts proposal image patches according to the Metropolis Hastings Markov Chain Monte Carlo algorithm.

In some embodiments, the patch match system randomly proposes a first patch 304 of the digital image 300. The patch match system determines the approximate similarity score of the patch 304 and probabilistically determines whether to accept the patch 304 as an approximate match to the target image patch 302 based on the determined score. The patch match system tests the proposed patch 304 to determine whether the proposed patch 304 is an approximate by following the probabilistic acceptance determination that is based on the approximate similarity heuristic as described above. In some embodiments, the patch match system determines an approximate similarity score for the proposed patch 304, which in turn affects the probability of the determination of whether to accept the proposed patch 304. If the approximate similarity score is lower (i.e., the proposed patch 304 is relatively similar to the target patch 302), then the patch match system is more likely to accept the proposed patch 304. Contrarily, if the approximate similarity score is higher, then the patch match system is less likely to accept the proposed patch 304 (i.e., the probability of acceptance is lower). Whether or not the patch match system accepts the proposed patch 304 as an approximate patch match, the patch match system continues through the algorithm by randomly proposing the next patch 306. Thus, if the next proposed patch 306 has an approximate similarity score that is relatively high, then the probability that the patch match system will accept the next proposed patch 306 is necessarily lower. In other words, the probability of acceptance is inversely proportional to the approximate similarity score according to the Metropolis Hastings algorithm.

Still following the Metropolis Hastings algorithm, the patch match system continues to propose subsequent patches (e.g., patches 308 and 310) of the image(s) 300 to test for similarity with the target patch 302 as described above. In some embodiments, the patch match system proposes candidate patches in a uniform distribution across the image 300. In other embodiments, the patch match system randomly proposes candidate patches throughout the search space (i.e., image(s) 300). In embodiments, the patch match system performs a conditional Metropolis Hastings algorithm—i.e., a Metropolis Hastings algorithm where the probability of accepting a subsequent patch proposal depends on the current or a previous patch proposal as shown in Algorithm 1 above. In other embodiments, the patch match system performs an independent Metropolis Hastings algorithm, where the probability of accepting a subsequent patch proposal does not depend on current or previous patch proposals, as described above and shown in Algorithm 2.

Oftentimes, the patch match system does not identify an approximate patch match on the first patch proposal 304 using the Metropolis Hastings algorithm. Moreover, in these embodiments, the patch match system randomly samples multiple image patches over a longer time period without identifying any approximate matches. Thus, the patch match system may iterate through a number of patch proposals (e.g., patches 304, 306, 308, and/or 310) before identifying a first approximate patch match. In some embodiments, the patch match system may take some time before converging on acceptable approximate patch matches by way of Markov Chain Monte Carlo sampling, often depending on the location of the first patch proposal 304 and/or the definition of the approximate similarity heuristic (e.g., looser approximations may be quicker to find than closer approximations). This phenomenon is sometimes referred to as startup bias. As shown in FIG. 2, the approximate similarity heuristic 204 experiences startup bias near the beginning of the curve before the approximation becomes closer to the true distribution 202. Because the patch match system may take some time to begin finding approximate patch matches, the patch match system may require a "burn-in" period. In other words, the patch match system may need to walk through the Metropolis Hastings algorithm for an initialization period before beginning to be more effective in finding acceptable patch matches (e.g., patches 304 and 310). Nonetheless, because evaluation time of the approximate similarity heuristic is so low, the burn-in does not substantially affect the speed of convergence. Indeed, despite the necessity of a burn in period in some embodiments, the Metropolis Hastings patch match system nevertheless converges onto patch matches much more quickly than generalized patch matching systems because of the efficiencies gained by the approximation determinations described above.

Returning now to FIG. 3, upon accepting a proposed patch (e.g., patch 304 and/or patch 310), the patch match system continues to propose additional patches of the digital image 300 as the patch match system "walks" through the Metropolis Hastings algorithm as described above and illustrated in FIG. 2. It will be noted that the patches 302, 304, 306, 308, and/or 310 in FIG. 3 are merely illustrative, and that image patches may be any shape, size, or dimension, as described above. In FIG. 3, the patch match system performs the Metropolis Hastings algorithm as described above to find those patches of the digital image 300 that are matches to the target patch 302. As can be seen in FIG. 3, image patches 304 and 310 more closely match the target image patch 302 than do image patches 306 and 308. In particular, the target patch 302 contains portions of bathroom wall tiles that are similar in appearance to the portions of bathroom wall tiles contained within patches 304 and 310. As an example of the Metropolis Hasting algorithm, in some embodiments shown in FIG. 3, the patch match system accepts the first patch 304 as an approximate patch match, rejects the second patch proposal 306, rejects the third patch proposal 308, and accepts the fourth patch proposal 310.

In some embodiments, once the patch match system has performed the Metropolis Hastings algorithm and identified approximate patch matches throughout the image(s) 300, the patch match system performs a more granulated analysis of the identified approximate patch matches (e.g., patches 304 and 310). In these or other embodiments, the patch match system determines a similarity score for each of the approximate patch matches 304 and 310 and identifies those patches whose similarity score matches that of the target patch 302—i.e., where the distance between the accepted patch 304 and/or 310 and the target patch 302 is zero. In some embodiments, the patch match system compares each pixel of a potential image patch match (e.g., approximate patch matches 304 and 310) with the corresponding pixel of the target patch 302 to determine if the potential patch match is indeed a match to the target patch 302. More particularly, the patch match system performs a sum of squared differences calculation to determine the similarity score (i.e., distance) of the approximate patch match 304 and/or 310 from the target patch 302.

As mentioned, a similarity score is a score for determining whether a given patch is an image patch match to the target patch 302. In some embodiments, the similarity score is a sum of squared differences calculation determined by iterating over all pixels within a given patch (e.g., the target patch 302 and/or an approximate patch matches 304 and/or 310) and calculating the mean squared error of a given patch as compared to the target patch. This calculation can be modeled, for example, by:

$$MSE = \frac{1}{n}\sum_{i=1}^{n}\left(\hat{Y}_i - Y_i\right)^2$$

where $\hat{Y}_i$ is a pixel within the given patch and $Y_i$ is the corresponding pixel of the target patch. In other embodiments, the similarity score is a detailed comparison of attributes of a proposed patch (e.g., patches 304 and/or 310) with the target patch 302 to determine if the proposed patch is a match to the target patch 302.

As discussed above, the patch match system probabilistically samples the search space based on the approximate similarity heuristic. In other words, when sampling the search space, the patch match system accepts or rejects each sample based on a probability inversely proportional to the approximate similarity score. This causes the patch match system to spend more time in areas of the search space that likely include matches. At the same time, the patch match system still samples areas of the search space not likely to include a match, just at a lower frequency. Thus, the patch match system avoids missing patch matches via probabilistic sampling.

Figure 4A:
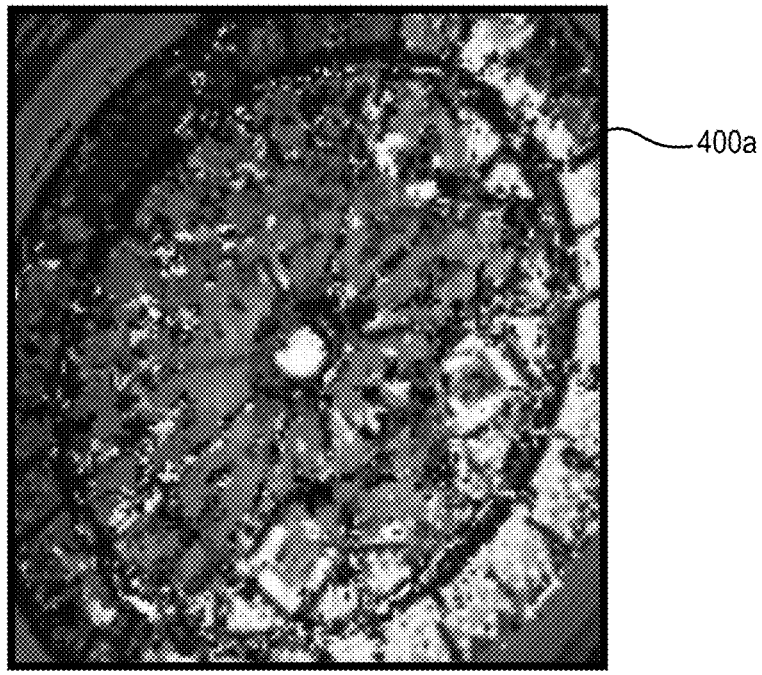
FIGS. 4A-4B illustrate example reconstruction images showing a comparison of the result of generalized patch match and a result produced by the patch match system in accordance with one or more embodiments.
Figure 4B:
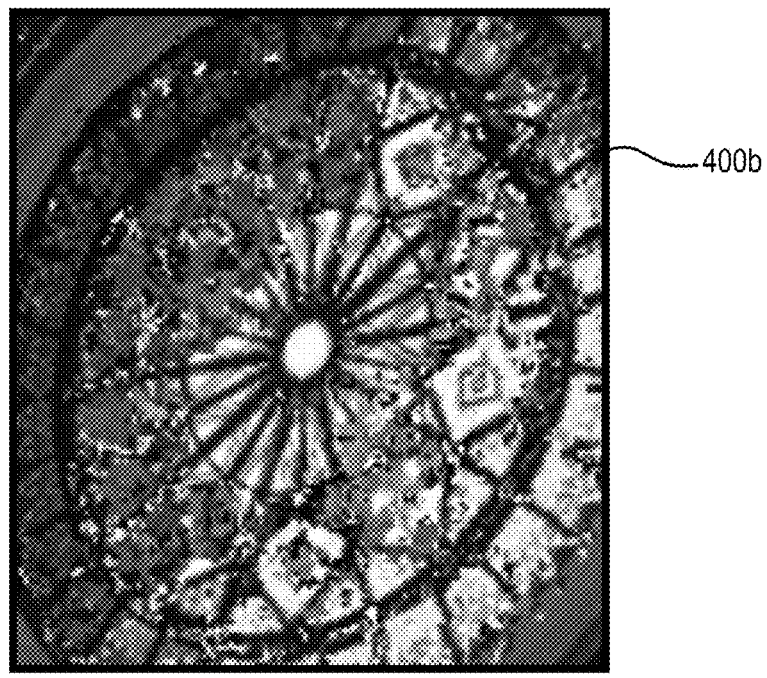

Looking now to FIGS. 4A and 4B, a comparison of generalized patch matching and Metropolis Hastings patch matching is shown. As shown, FIGS. 4A and 4B are illustrative of the effectiveness of using Metropolis Hastings image patch matching. FIG. 4A depicts an image 400*a* of a stained glass window with missing portions and various imperfections. FIG. 4B depicts a cleaned up version 400*b* of the same image of a stained glass window. The images 400*a* and 400*b* have been patch matched to fill/replace bad portions of the images 400*a* and 400*b*. FIG. 4A illustrates the result of generalized patch matching, whereas FIG. 4B illustrates the result according to one or more embodiments of the Metropolis Hastings patch match system described herein. FIGS. 4A and 4B depict results of cleaning up the image 400*a* and 400*b* after a given time interval (e.g., 400 seconds), using the different methods. For example, in FIG. 4A, the image 400*a* of the stained glass window is lower quality with various missing or splotchy portions that have not yet been patch matched within the allotted time (e.g., 400 seconds). In FIG. 4B, the patch matching results show a greater proportion of the image 400*b* that is clearer and more filled in (i.e., "cleaned up"). Thus, as can be seen in FIGS. 4A and 4B, the patch match system described herein results in quicker patch matching and faster convergence on a desirable end result by probabilistically sampling image patches of a search space based on an approximate similarity heuristic.

Figure 5:
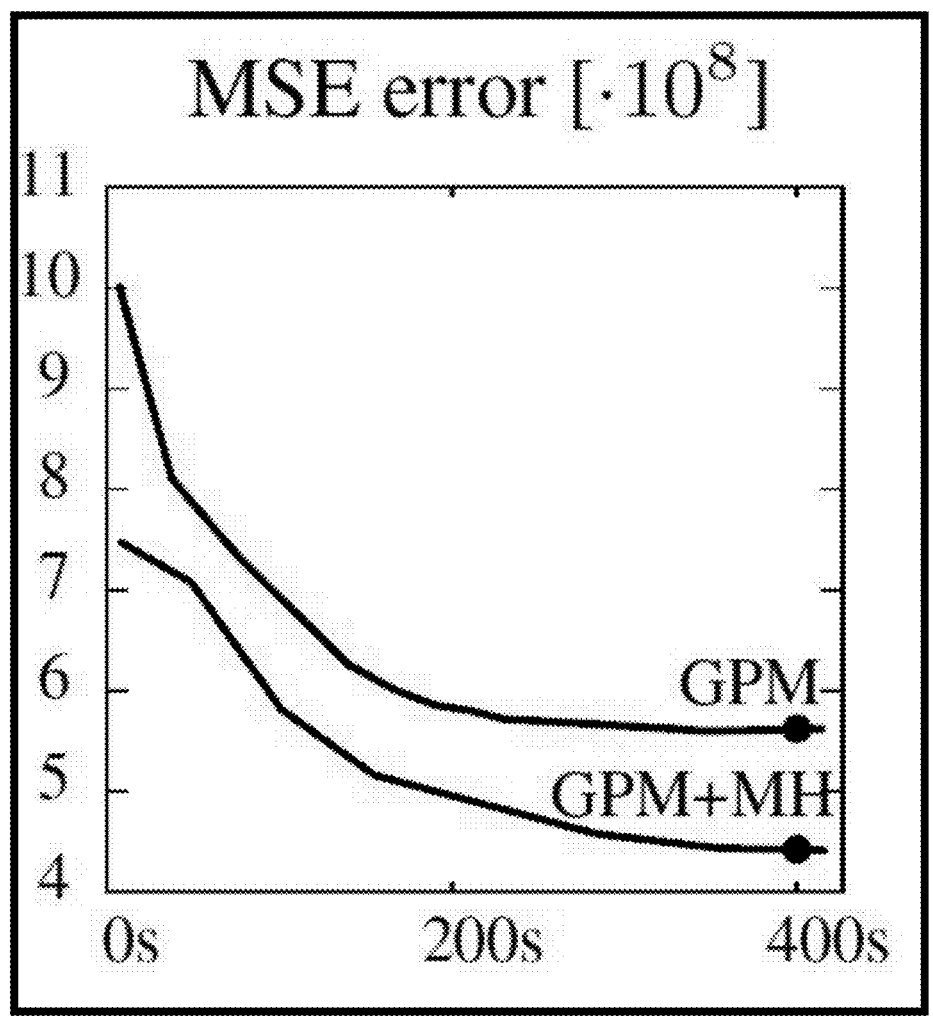
FIG. 5 illustrates an error plot quantifying the results of FIGS. 4A and 4B.

In conjunction with FIGS. 4A and 4B, FIG. 5 depicts a graphical representation of a mean squared error (MSE) comparison of generalized patch matching (GPM) versus generalized patch matching using Metropolis Hastings (GPM+MH) over a 400 second span. As can be seen from FIG. 5, the Metropolis Hastings patch matching has a smaller mean squared error and approaches a mean squared error of zero more quickly than does the generalized patch matching. Looking at FIGS. 4A, 4B, and FIG. 5 together, the differences in generalized patch matching and Metropolis Hastings patch matching can be seen in one particular embodiment.

Figure 6:
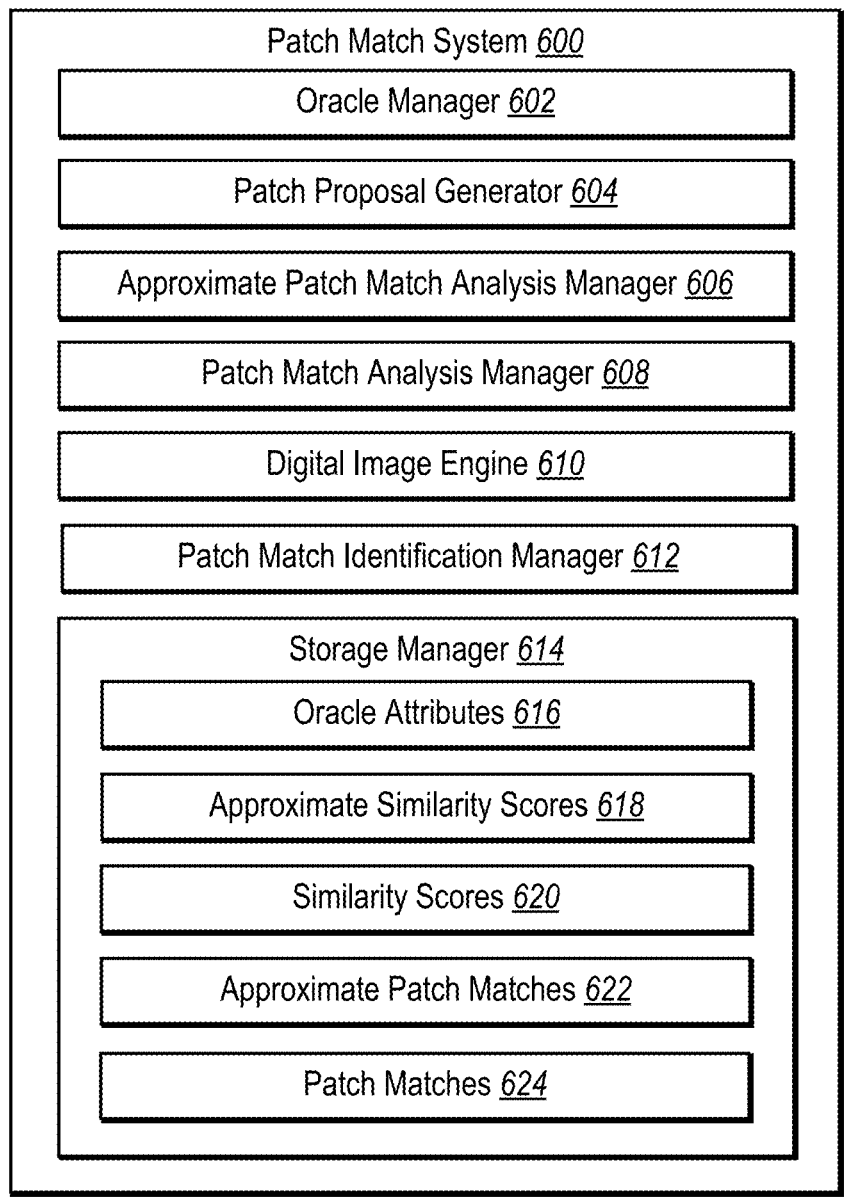
FIG. 6 illustrates a schematic diagram of a patch match system in accordance with one or more embodiments.

Turning now to FIG. 6, additional detail is provided regarding components and capabilities of one embodiment of the patch match system. In particular, FIG. 6 illustrates an embodiment of an exemplary patch match system 600 (e.g., the patch match system referenced above). As shown, the patch match system 600 may include, but is not limited to, an oracle manager 602, a patch proposal generator 604, an approximate patch analysis manager 606, a patch match analysis manager 608, a digital image engine 610, a patch match identification manager 612, and a storage manager 614.

As just mentioned, and as illustrated in FIG. 6, the patch match system 600 includes an oracle manager 602. The oracle manager 602 can create, modify, revise, and/or determine one or more approximate similarity heuristics or oracles. For example, the oracle manager 602 can create a distribution of a digital image based on approximate similarity scores of patches throughout the digital image. Furthermore, the oracle manager 602 can learn an approximate similarity heuristic based on an analysis of a plurality of images as described above.

As shown in FIG. 6, the patch match system 600 also includes the patch proposal generator 604. The patch proposal generator 604 can randomly or uniformly generate proposed patches to test for similarity to the target patch. For example, the patch proposal generator 604 performs the "walk" through the probabilistic sampling algorithm by randomly generating candidate patches. In other words, the patch proposal generator 604 can sample image patches.

As illustrated in FIG. 6, the patch match system 600 also includes the approximate patch analysis manager 606. The approximate patch analysis manager 606 can analyze sampled image patches to determine whether each proposed patch (e.g., patches proposed by the patch proposal generator 604) is an approximate match of the target patch. For example, the approximate patch analysis manager 606 can determine whether each proposed patch is an approximate match of the target patch based on an approximate similarity score. In other words, the approximate patch analysis manager 606 determines, based on a probability, whether to accept or reject a sampled image patch based on the approximate similarity heuristic.

In addition, as shown in FIG. 6, the patch match system 600 also includes the patch match analysis manager 608. The patch match analysis manager 608 can analyze accepted patches to determine whether they are matches to the target patch. For example, the patch match analysis manager 608 can analyze approximate patch matches (e.g., those patches that are identified as approximate patch matches by the approximate patch analysis manager 606) to determine whether the approximate patch matches are precise/exact patch matches. In particular, the patch match analysis manager 608 can evaluate accepted patches using a similarity heuristic (such as sum-of-square distances as described above) to determine if an accepted patch matches a target patch.

As shown in FIG. 6, the patch match system 600 also includes the digital image engine 610. The digital image engine 610 can generate, create, modify, render, and/or provide for display one or more digital images. In particular, the digital image engine 610 can generate a modified digital image by manipulating pixels of an input digital image using identified image patches that matches the target image patch.

As further illustrated in FIG. 6, the patch match system 600 also includes the patch match identification manager 612. The patch match identification manager 612 can identify patches in one or more images that match a target patch. For example, the patch match identification manager can identify those patches that match the target patch in response to the analysis of the precise patch analysis manager 608.

Moreover, as illustrated in FIG. 6, the patch match system 600 includes the storage manager 614. The storage manager 614 maintains data to perform the functions of the patch match system 600. Thus, the storage manager 614 can comprise memory as described below. As illustrated, the storage manager 614 includes oracle attributes 616, approximate similarity scores 618, precise similarity scores 620, approximate patch matches 622, and precise patch matches 624.

Each of the components 602-624 of the patch match system 600 and their corresponding elements (as shown in FIG. 6) may be in communication with one another using any suitable communication technologies. It will be recognized that although components 602-624 of the patch match system 600 and their corresponding elements are shown to be separate in FIG. 6, any of components 602-624 and their corresponding elements may be combined into fewer components, such as into a single facility or module, divided into more components, or configured into different components as may serve a particular embodiment.

The components 602-624 of the patch match system 600 and their corresponding elements can comprise software, hardware, or both. For example, the components 602-624 and their corresponding elements can comprise one or more instructions stored on a computer-readable storage medium and executable by processors of one or more computing devices. When executed by the one or more processors, the computer-executable instructions of the patch match system 600 can cause a client device and/or a server device to perform the methods described herein. Alternatively, the components 602-624 and their corresponding elements can comprise hardware, such as a special purpose processing device to perform a certain function or group of functions. Additionally, the components 602-624 and their corresponding elements can comprise a combination of computer-executable instructions and hardware.

Furthermore, the components 602-624 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-624 may be implemented as a standalone application, such as a desktop or mobile application. Furthermore, the components 602-624 may be implemented as one or more web-based applications hosted on a remote server. The components 602-624 may also be implemented in a suite of mobile device applications. To illustrate, the components 602-624 may be implemented in an application, including but not limited to ADOBE® PHOTOSHOP® or ADOBE® PREMIERE® software. "ADOBE," "PHOTOSHOP," and "PREMIERE" are either registered trademarks or trademarks of Adobe Systems Incorporated in the United States and/or other countries.

Figure 7:
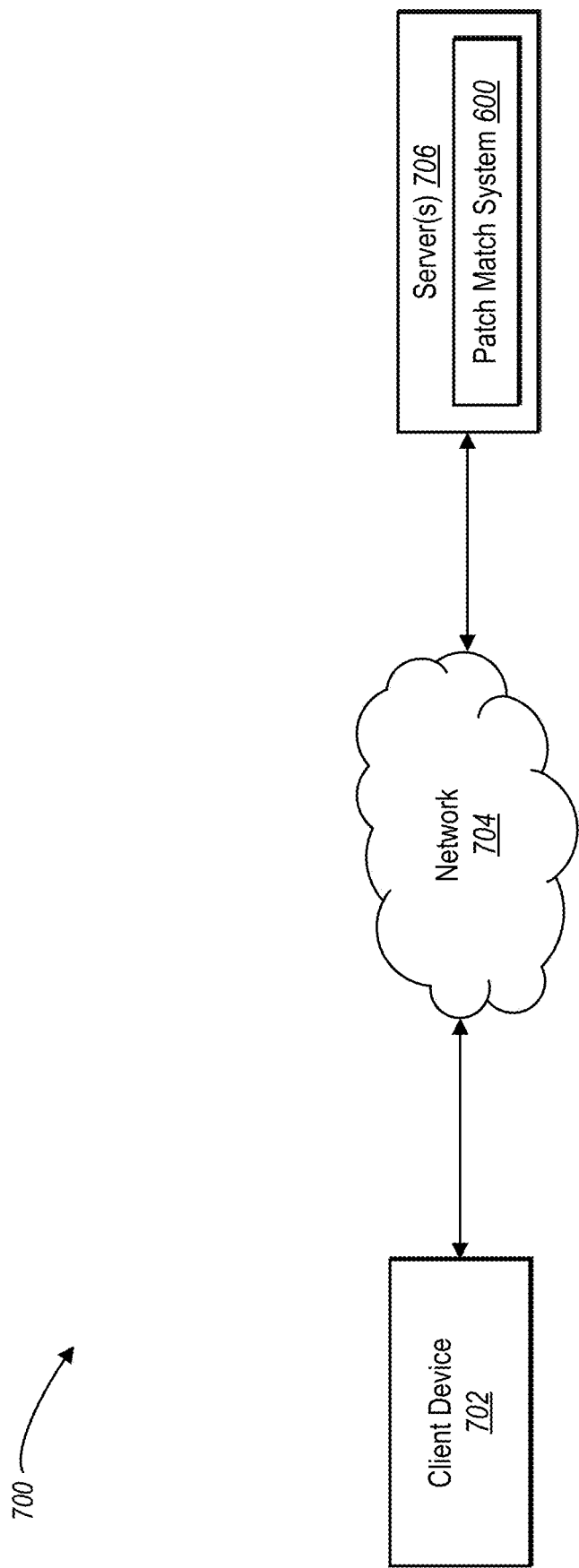
FIG. 7 illustrates an example environment in which the patch match system operates in accordance with one or more embodiments.

FIG. 7 illustrates a schematic diagram of one embodiment of an exemplary environment 700 in which the patch match system 600 operates. In one or more embodiments, the exemplary environment 700 includes a client device 702, a network 704, and one or more servers 706. The network 704 may be any suitable network over which the computing devices can communicate.

As illustrated in FIG. 7, the environment 700 may include a client device 702. The client device 702 may comprise any computing device (e.g., the computing device 102). For instance, in one or more embodiments, the client device 702 comprises any computing device described below in relation to FIG. 10.

In addition, the environment 700 may also include the server(s) 706. The server(s) 706 may generate, store, receive, and transmit any type of data, including oracle attributes 616, approximate similarity scores 618, precise similarity scores 620, approximate patch matches 622, and/ or precise patch matches 624. For example, the server(s) 706 may transmit data to a client device, such as the client device 702. The server(s) 706 can also transmit electronic messages between one or more users of the environment 700. In one example embodiment, the server(s) 706 comprise a content server. The server(s) 706 can also comprise a communication server or a web-hosting server.

As illustrated, in one or more embodiments, the server(s) 706 can include all, or a portion of, the patch match system 600. In particular, the patch match system 600 can comprise an application running on the server(s) 706 or a portion of a software application that can be downloaded from the server(s) 706. For example, the patch match system 600 can include a web hosting application that allows the client device 702 to interact with content hosted at the server(s) 706. To illustrate, in one or more embodiments of the exemplary environment 700, the client device 702 can access a webpage supported by the server(s) 706. In particular, the client device 702 can run an application to allow a user to access, view, and/or interact with a webpage or website hosted at the server(s) 706.

Although FIG. 7 illustrates a particular arrangement of the client device 702, the network 704, and the server(s) 706, various additional arrangements are possible. For example, while FIG. 7 illustrates a separate client device 702 communicating with the server(s) 706 via the network 704, in one or more embodiments a single client device may communicate directly with the server(s) 706, bypassing the network 704.

Similarly, although the environment 700 of FIG. 7 is depicted as having various components, the environment 700 may have additional or alternative components. For example, the patch match system can be implemented on a single computing device. In particular, the patch match system may be implemented in whole by the client device 702, or the patch match system may be implemented in whole by the server(s) 706. Alternatively, the patch match system may be implemented across multiple devices or components (e.g., utilizing the client device 702 and the server(s) 706).

By way of example, in one or more embodiments, the client device 702 sends a request to the server(s) 706 to perform a patch matching operation. For instance, the client device 702 can provide user input to the server(s) 706 defining a target patch within an image. The server(s) 706 can generate a series of patch matches based on the user input (e.g., through the patch proposal generator 604, the approximate patch analysis manager 606, the precise patch analysis manager 608, and the patch match identification manager 612). The client device 702 can send a request to the server(s) 706 to search for patch matches of a target patch. In response, the server(s) 706 can propose and test patches throughout to image to identify those patches that most closely match the target patch (e.g., via the approximate patch analysis manager 606, the precise patch analysis manager 608, and the patch match identification manager 612). The server(s) 706 can also provide to the client device 702 instructions for performing all or part of the patch matching operation on the client device 702. The server(s) 706 can also provide one or more digital images for display on the client device 702 after the patch matching operation is complete.

Furthermore, the client device 702 can provide user input in relation to patches within the digital image(s) and send a request to the server(s) 706 to narrow or refine the patch match results returned from the server(s) 706. The server(s) 706 can adjust the oracle or approximate similarity heuristic via the oracle manager 602.

Figure 8:
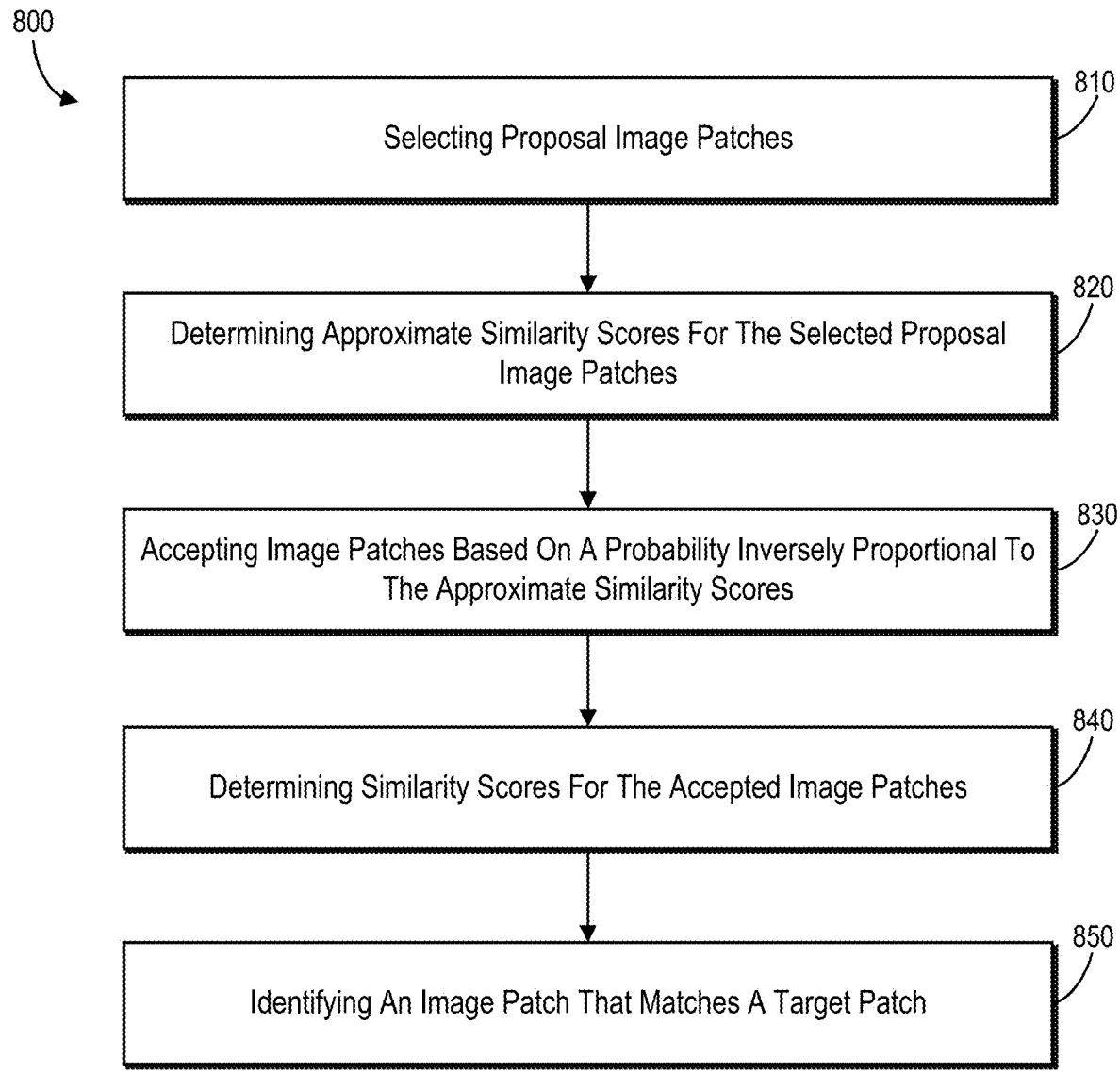
FIG. 8 illustrates a flowchart of a series of acts in a method of identifying an image patch match in accordance with one or more embodiments.

FIGS. 1-7, the corresponding text, and the examples, provide a number of different systems and methods that perform image patch matching. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method 800 of image patch matching. In one or more embodiments, the method 800 is performed in a digital medium environment for performing one or more of digital image modifications or digital image object recognition (i.e., performed by software running on one or more computing devices). The method 800 is intended to be illustrative of one or more methods in accordance with the present disclosure, and is not intended to limit potential embodiments. Alternative embodiments can include additional, fewer, or different steps than those articulated in FIG. 8.

As illustrated in FIG. 8, the method 800 includes an act 810 of selecting proposal image patches. For example, act 810 can involve randomly or uniformly selecting proposal patches and then accepting the proposal patches using a probabilistic sampling algorithm based on the approximate similarity heuristic that visits the search space in rough proportion to a similarity heuristic. For example, act 810 can involve sampling using a Markov Chain Monte Carlo algorithm. More specifically, act 810 can involve creating a Markov chain whose values approximate a posterior distribution (e.g., the similarity heuristic). Act 810 can involve sampling from a proposal distribution based on an approximate similarity heuristic that attempts to converge on the posterior distribution. In particular, act 810 can involve sampling using a Metropolis Hastings algorithm. In one or more embodiments, act 810 involves selecting a subsequent image patch based on the probability of acceptance of a previous patch proposal. Alternatively, act 810 involves selecting a subsequent image patch independent of, or not conditioned upon, the probability of acceptance of a previous patch proposal.

In addition, the method 800 also includes an act 820 of determining approximate similarity scores for selected proposal image patches. In particular, the act 820 includes determining a similarity score by evaluating an approximate similarity heuristic for the sampled image patches. For example, act 820 can involve one or more of determining a mean pixel value by averaging the pixel values within a sampled image patch, determining an average color of a sampled image patch, determining a texture of a sampled image patch, detecting edges in a sampled image patch, determining a mean and variance of a sampled image patch, determine a spatial position of a sampled image patch, or determining a rotation invariant patch distance.

Moreover, as shown in FIG. 8, the method 800 also includes an act 830 of accepting image patches based a probability inversely proportional to the approximate similarity scores. In particular, the act 830 includes following the probability function described above to, after selecting proposal image patches, probabilistically determine whether to accept the selected proposal image patches as approximate matches to the target image patch. Act 830 can involve comparing an approximate similarity score for a sampled image patch to an approximate similarity score of a target image patch. For example, act 830 can involve comparing a mean pixel value for each sampled image patch with a mean pixel value of the target image patch. Act 830 can involve identifying selected proposal image patches that have a high probability of matching the target image patch according to the approximate similarity heuristic. For example, act 830 can involve accepting and/or rejecting proposal image patches, as determined by a probabilistic algorithm, where the probability of accepting the proposal image patches is based on approximate similarity scores of the respective proposal image patches in the ways described above.

Additionally, the method 800 includes an act 840 of determining similarity scores for the identified sampled image patches. In particular, act 840 can involve determining similarity scores for the selected proposal image patches accepted as approximate patch matches (e.g., as defined by act 830 above). In at least one embodiment, the act 840 includes determining, for each of the identified image patches, a sum of squared differences from the target image patch, as described in more detail above. In other embodiments, the act 840 includes determining an error (e.g., cumulative difference of each pixel, average difference of one or more pixels as a group, etc.) between the sampled image patch and the target image patch. In any event, act 840 can involve making a more accurate determination of whether an image patch matches a target image patch than the previously determined approximate similarity scores. In one or more embodiments, act 840 involves not determining a similarity score for image patches not probabilistically accepted.

Furthermore, the method 800 includes an act 850 of identifying an image patch that matches a target image patch. For example, act 850 involves using the determined similarity scores as a basis for identifying one or more image patches that match the target image patch. In particular, the act 850 includes determining sampled image patches having similarity score with a distance of zero from the target image patch. In other words, the act 850 includes designating those image patches whose distance from the target patch is zero or close to zero (i.e., those image patches whose approximate similarity score is very low) as matches to the target patch.

In some embodiments, the method 800 includes an additional act of generating a modified digital image by manipulating pixels of an input digital image using the identified image patch that matches the target image patch. In particular, in some embodiments, the patch match system uses the identified image patches that match the target image patch to generate a modified digital image by manipulating pixels to correct image flaws, fill in blank space, clarify the image, remove image artifacts, in-paint, etc.

In the same or other embodiments, the method 800 includes additional acts of analyzing a plurality of digital images including known image patch matches, learning one or more image features that correspond with image patch matches, and using a heuristic based on the learned one or more features as the approximate similarity heuristic. In particular, the patch match system uses the heuristic based on the learned one or more features to identify sampled image patches that, when probabilistically sampled, are likely approximate patch matches (e.g., image patches that, when compared to the heuristic based on the learned one or more features, are more likely to be accepted by the patch match system according to the probabilistic sampling algorithm).

Figure 9:
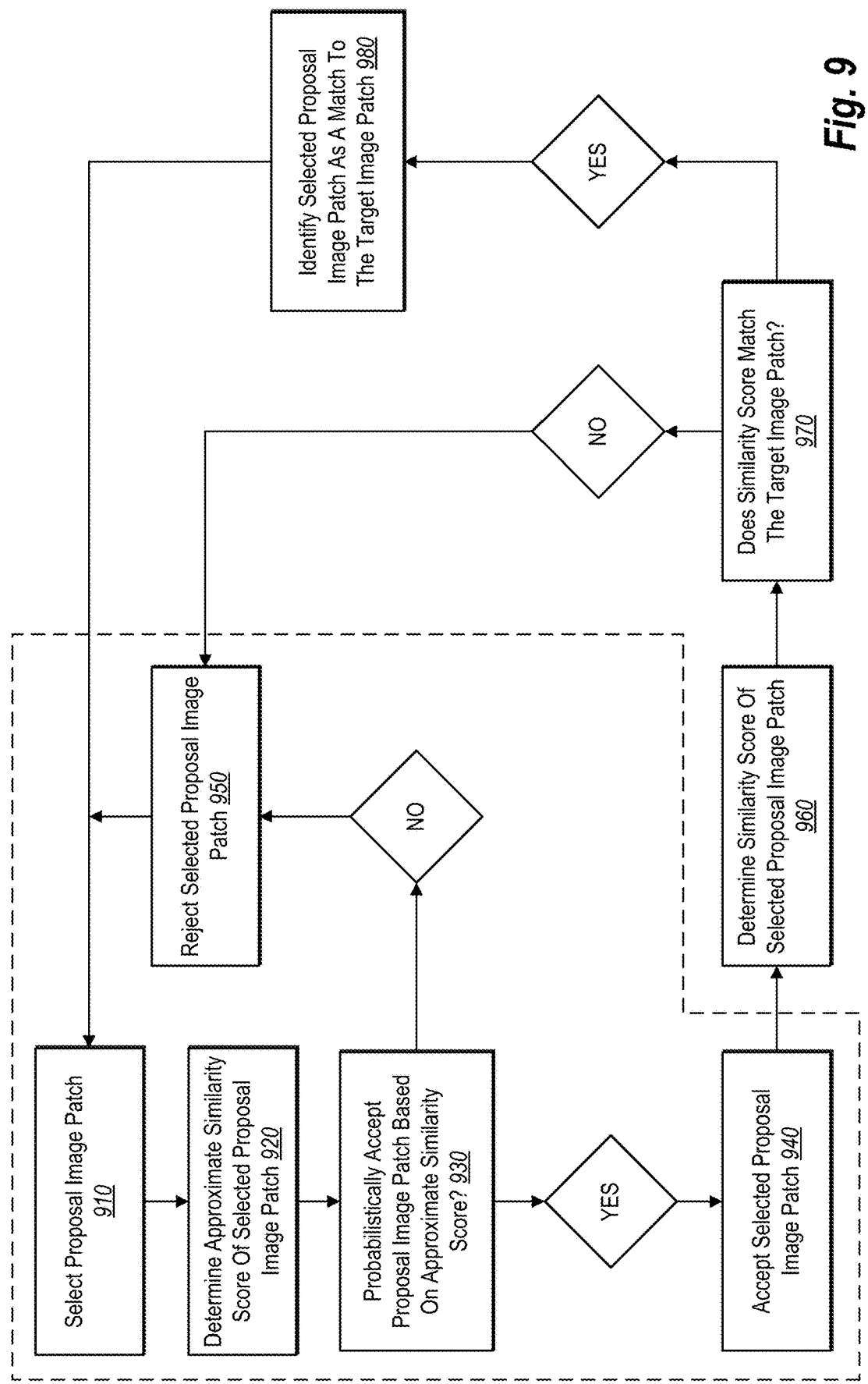
FIG. 9 illustrates a diagram of an algorithm for performing a step for probabilistically accepting image patches of selected proposal image patches based on an approximate similarity heuristic in accordance with one or more embodiments.

Looking now to FIG. 9, an algorithm illustrating acts 910-950 for performing a step for probabilistically accepting image patches of selected proposal image patches based on an approximate similarity heuristic is shown. Additionally, FIG. 9 also includes acts 960-980 to identify a proposal image patch as a match to the target image patch.

In FIG. 9, act 910 involves selecting a proposal digital image patch. In particular, the patch match system randomly or uniformly selects a proposal image patch. To illustrate, the patch match system begins searching for an image patch that matches the target image patch by selecting one image patch at a time. The patch match system proposes a sample image patch to test for similarity to the target image patch. The patch match system randomly proposes patches.

In addition, FIG. 9 illustrates an act 920 to determine an approximate similarity score of a selected proposal image patch. In particular, act 920 includes applying an approximate similarity heuristic to a search space to calculate the approximate distance of the proposal image patch from the target patch. For example, act 920 can include using any of the approximate similarity heuristics described above to determine an approximate similarity score.

Further looking to FIG. 9, act 930 includes determining whether to probabilistically accept the proposal image patch. In particular, the act 930 involves accepting the proposal image patch based on a probability, which probability is in turn based on the approximate similarity heuristic as described above.

FIG. 9 also illustrates that act 940 includes accepting the proposal image patch. In particular, the probability of accepting the proposal image patch within the Metropolis Hastings algorithm is based on the approximate similarity score of the proposal image patch, as previously described. Accepting a proposal image patch (act 940) signifies that the accepted proposed image patch is eligible for additional testing to determine whether the accepted proposed digital image has a similarity score that matches the target image patch (e.g., acts 960 and 970 described below).

FIG. 9 further shows that the step for probabilistically accepting image patches of the selected proposal image patches based on an approximate similarity heuristic includes an act 950 of rejecting the proposed image patch based on a probabilistic determination as described above. In particular, if the proposal image patch has a bad (e.g., large distance) approximate similarity score, then the probability that the patch match system determines, according to the Metropolis Hastings algorithm, to reject the proposed image patch (act 950) is greater. By rejecting the proposed image patch (act 950), the patch match system determines that the proposed image patch does not warrant performing additional tests on the proposed image patch to determine if the patch matches the target image patch.

In one or more embodiment, accepting or rejecting the proposed digital image patch is based on an acceptance probability. For example, the acceptance probability can be a ratio of posterior and proposal probabilities. In one or more embodiments, the patch match system uses a difference of patch means passed through a Gaussian. Furthermore, because the patch match system uses a ratio to determine the posterior probability, they patch match system may not use a normalizing factor.

FIG. 9 illustrates an act 960 to determine, in response to accepting the proposed image patch, a similarity score of the proposal image patch. In particular, the act 960 includes the patch match system utilizing any of the similarity heuristics described above. For example, act 960 can involve performing a sum of squared differences calculation between the accepted proposed image patch and the target image patch, as described in further detail above. In other embodiments, the patch match system determines a similarity score of the accepted proposed image patch (act 960) by calculating a difference of each corresponding pixel of the proposed image patch and the target image patch.

FIG. 9 also illustrates an act 970 to determine whether the similarity score matches the target image patch. In some embodiments, the patch match system determines whether the similarity score of the proposal image patch matches the target image patch by determining whether the similarity score of the proposal image patch is the same as or nearly the same as the similarity score of the target image patch (i.e., for a distance of zero or near zero), as described above.

Further shown in FIG. 9 is an act 980 of identifying, in response to a determination that the similarity score of the proposal image patch matches the target image patch, the proposal image patch as a match to the target image patch. In other words, if the patch match system determines that the similarity score of the proposal image patch matches the target image patch (act 970), and then the patch match system identifies the proposal image patch as a match to the target image patch (act 980).

In response to a determination that the similarity score of the proposal image patch does not match the target image patch, the patch match system rejects the proposal image patch (act 950). In other words, if the patch match system determines that the similarity score of the proposal image patch does not match the target image patch, then the patch match system rejects the proposal image patch. That is to say, the patch match system identifies the proposal image patch as not matching the target image patch.

As described above, FIG. 9 illustrates an iterative algorithm that instructs the patch match system to repeatedly perform the acts described therein until the patch match system completes the algorithm by identifying at least one image patch that matches the target image patch. In other embodiments, the patch match system repeats the algorithm until the patch match system has completely searched the image (e.g., the patch match system has proposed and tested every approximate image patch match). In the above-described or alternative embodiments, in response to rejecting the proposal image patch (act 950) or identifying the proposal image patch as a match to the target image patch (act 980), the patch match system cycles through the algorithm again by repeating the act 910 of selecting another proposal image patch. The patch match system further performs the acts 920-980 until the algorithm is completed.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
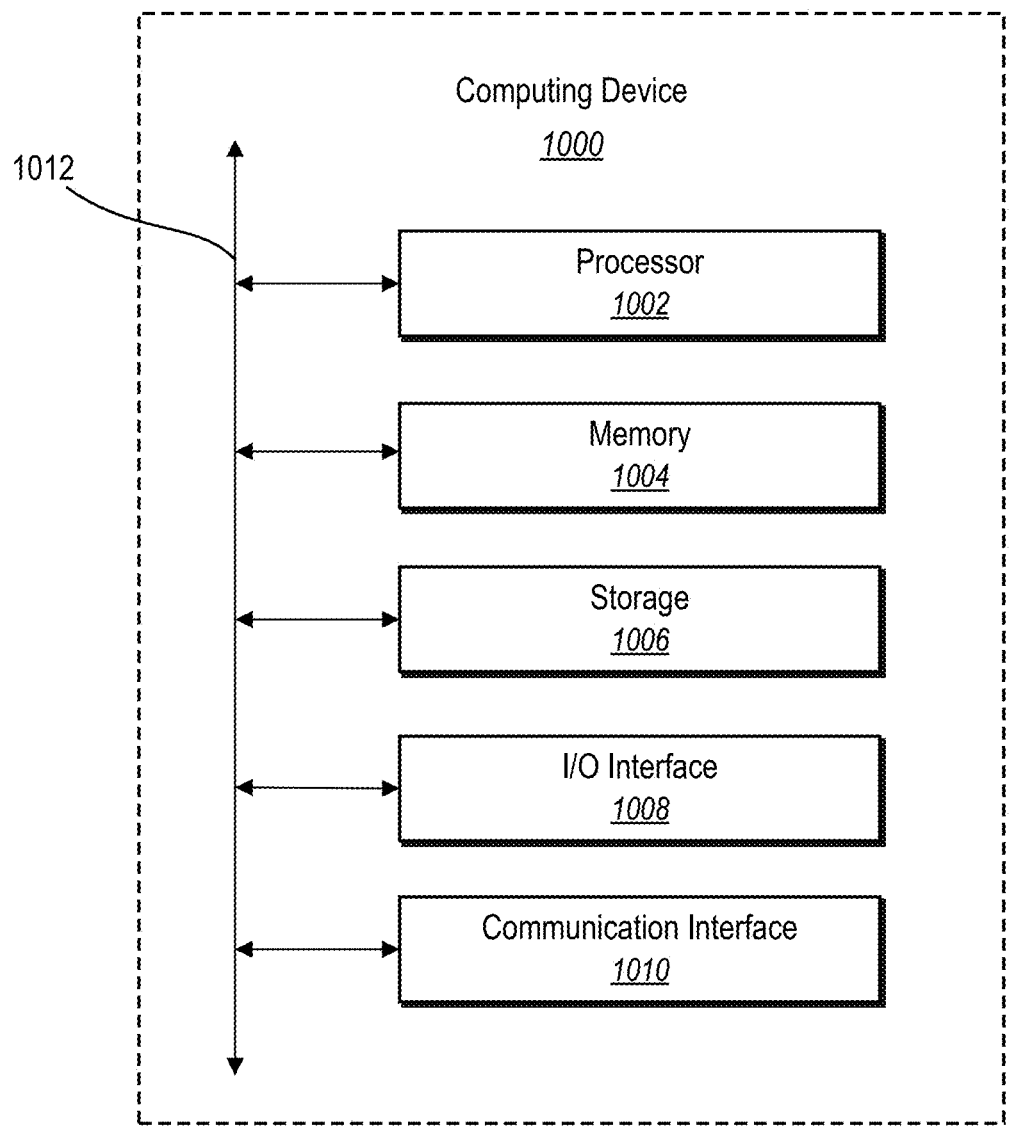
FIG. 10 illustrates a block diagram of an example computing device in accordance with one or more embodiments.

FIG. 10 illustrates, in block diagram form, an exemplary computing device 1000 that may be configured to perform one or more of the processes described above. One will appreciate that the patch match system 1000 can comprise implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for performing one or more of digital image modifications or digital image object recognition, a computer-implemented method of image patch matching comprising:
   using an oracle, as part of a patch match search, to identify areas of an image likely to have a patch that matches a target image patch;
   evaluating image patches in the areas of the image identified by the oracle as likely to have a patch that matches the target image patch; and identifying an image patch that matches the target image patch from the image patches in the areas of the image identified by the oracle as likely to have a patch that matches the target image patch.

2. The computer-implemented method of claim 1, further comprising generating a modified digital image by manipulating pixels of an input digital image using the identified image patch that matches the target image patch.

3. The computer-implemented method of claim 2, wherein using the oracle to identify areas of the image likely to a patch that matches the target image patch comprises using an approximate similarity heuristic to determine whether to accept proposal image patches as approximate patch matches.

4. The computer-implemented method of claim 3, wherein using the approximate similarity heuristic to determine whether to accept proposal image patches as approximate patch matches comprises determining approximate similarity scores for the proposal image patches and probabilistically accepting the proposal image patches based on the determined approximate similarity scores.

5. The computer-implemented method of claim 4, wherein probabilistically accepting the proposal image patches based on the determined approximate similarity scores comprises sampling using a Markov Chain Monte Carlo algorithm.

6. The computer-implemented method of claim 4, wherein the approximate similarity heuristic comprises a mean pixel heuristic.

7. The computer-implemented method of claim 4, wherein evaluating the image patches in the areas of the image identified by the oracle as likely to have a patch that matches the target image patch comprises determining similarity scores for the accepted proposal image patches using a similarity heuristic.

8. The computer-implemented method of claim 7, wherein identifying the image patch that matches the target image patch comprises identifying an evaluated image patch having a similarity score closest to the target image patch.

9. A non-transitory computer-readable medium storing instructions that, when executed by at least one processor, cause a computer system to:
select proposal image patches;
determine approximate similarity scores for the selected proposal image patches;
accept image patches from the selected proposal image patches to further evaluate based on the approximate similarity scores;
determine similarity scores for the accepted image patches; and
identify, based on the determined similarity scores, an image patch that matches a target image patch.

10. The non-transitory computer-readable medium as recited in claim 9, further comprising instructions that, when executed by the at least one processor, cause the computer system to generate a modified digital image by manipulating pixels of an input digital image using the identified image patch that matches the target image patch.

11. The non-transitory computer-readable medium as recited in claim 9, wherein the instructions, when executed by the at least one processor, cause the computer system to select proposal image patches by randomly selecting the proposal image patches from a search space.

12. The non-transitory computer-readable medium as recited in claim 9, wherein the instructions, when executed by the at least one processor, cause the computer system to accept image patches from the selected proposal image patches to further evaluate based on the approximate similarity scores by probabilistically sampling the proposal image patches based the approximate similarity scores.

13. The non-transitory computer-readable medium as recited in claim 12, wherein probabilistically sampling the proposal image patches based the approximate similarity scores comprises accepting image patches from the selected proposal image patches to further evaluate based on a probability inversely proportional to the approximate similarity scores.

14. The non-transitory computer-readable medium as recited in claim 9, further comprising instructions that, when executed by the at least one processor, cause the computer system to avoid determining similarity scores for proposal image patches based on the approximate similarity scores.

15. The non-transitory computer-readable medium as recited in claim 9, wherein the instructions, when executed by the at least one processor, cause the computer system to determine approximate similarity scores for the selected image patches by determining one or more of determining a mean pixel value by averaging the pixel values within a sampled image patch, determining an average color of a sampled image patch, determining a texture of a sampled image patch, detecting edges in a sampled image patch, determining a mean and variance of a sampled image patch, determine a spatial position of a sampled image patch, or determining a rotation invariant patch distance.

16. The non-transitory computer-readable medium as recited in claim 15, wherein the similarity heuristic comprises a sum of square differences heuristic.

17. A system for performing one or more of digital image modifications or digital image object recognition comprising:
a memory comprising:
a similarity heuristic that allows for a determination of whether image patches match; and
an approximate similarity heuristic that is less computationally intensive than the similarity heuristic; and
a server device comprising instructions thereon that, when executed by at least one processor, cause the server device to:
identify proposal image patches;
determine approximate similarity scores for the proposal image patches using the approximate similarity heuristic;
accept proposal image patches to further evaluate based on the approximate similarity scores;
determine, using the similarity heuristic, similarity scores for the accepted proposal image patches; and
identify one or more image patches that match a target image patch based on the determined similarity scores.

18. The system as recited in claim 17, wherein the instructions, when executed by the at least one processor, cause the server device to use the approximate similarity heuristic to determine whether to accept proposal image patches to further evaluate by probabilistically accepting the proposal image patches based on the determined approximate similarity scores.

19. The system as recited in claim 18, wherein probabilistically accepting the proposal image patches based on the determined approximate similarity scores comprises sampling using a Markov Chain Monte Carlo algorithm.

20. The system as recited in claim 19, wherein sampling using the Markov Chain Monte Carlo algorithm comprises sampling using a Metropolis Hastings algorithm.

* * * * *